R. STOCK.
STEERING DEVICE FOR POWER PROPELLED VEHICLES.
APPLICATION FILED OCT. 19, 1909.

1,022,160. Patented Apr. 2, 1912.

Witnesses:
H. B. Tomkin
M. L. Brose

Inventor:
Robert Stock
by John Lotka
Attorney.

UNITED STATES PATENT OFFICE.

ROBERT STOCK, OF BERLIN, GERMANY.

STEERING DEVICE FOR POWER-PROPELLED VEHICLES.

1,022,160.  Specification of Letters Patent.  Patented Apr. 2, 1912.

Application filed October 19, 1909. Serial No. 523,447.

*To all whom it may concern:*

Be it known that I, ROBERT STOCK, a subject of the German Emperor, and resident of Berlin, Germany, have invented certain new and useful Improvements in Steering Devices for Power-Propelled Vehicles, of which the following is a specification.

In many agricultural machines, such as, for instance, plows, provision must be made for raising or lowering the devices (as, the plow-shares) which work the soil, so as to regulate the action of such devices. In a power-propelled agricultural vehicle, the raising and lowering of the steering wheel relatively to the frame (or rather, vice-versa) affords a convenient way of regulating, say, the depth of the furrow.

My present invention relates to a novel mechanism for raising and lowering the steering wheel without interfering with its mobility for steering purposes.

Reference is to be had to the accompanying drawings, in which—

Figure 1:
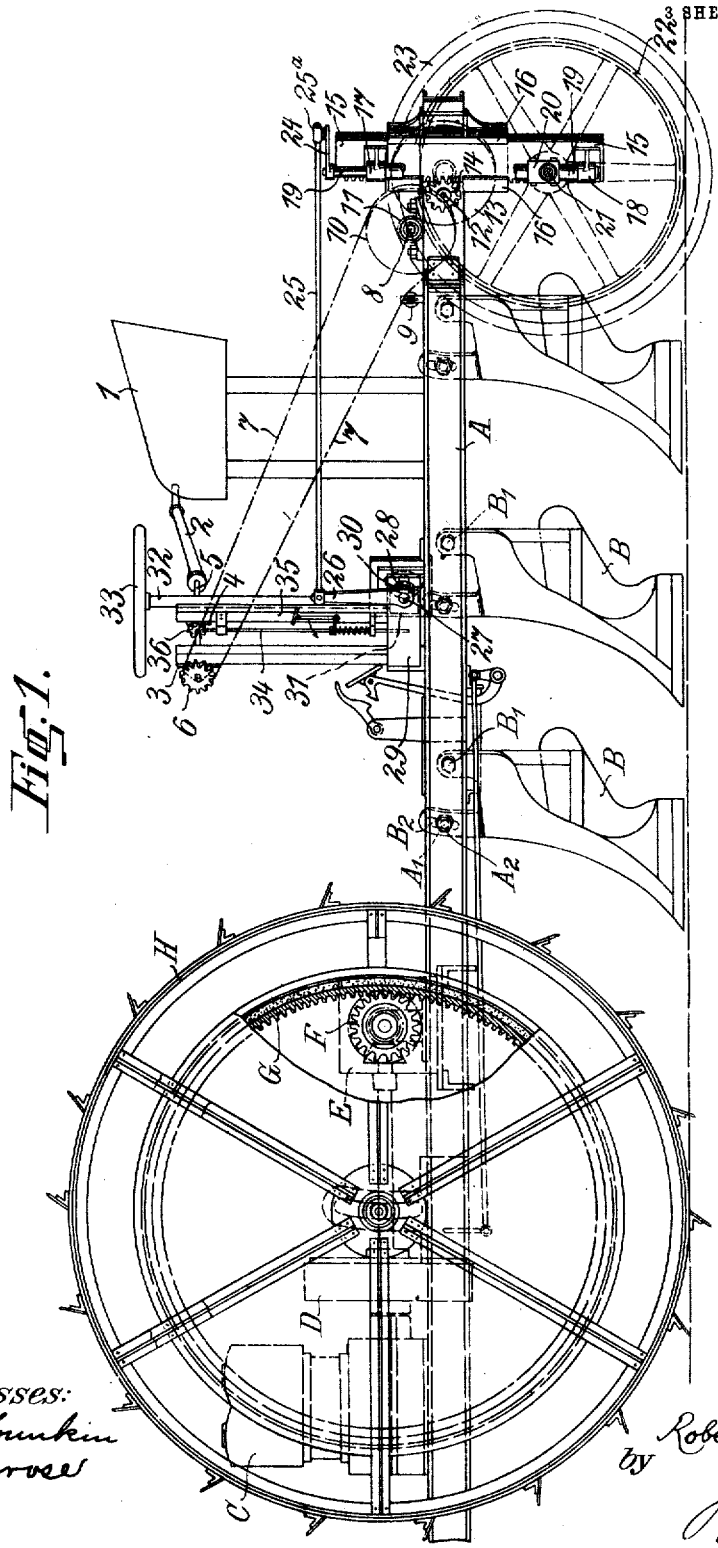
Figure 2:
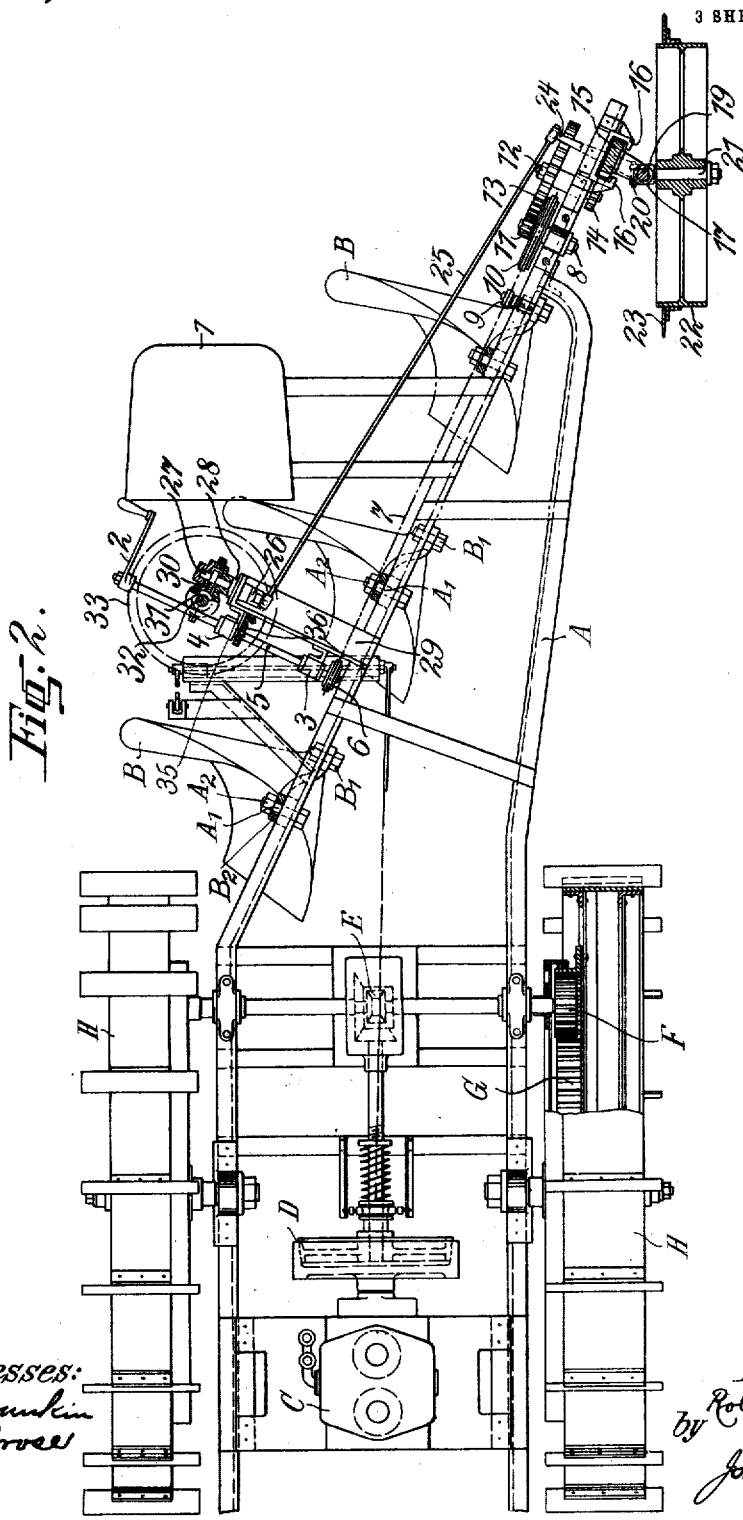
Figure 3:
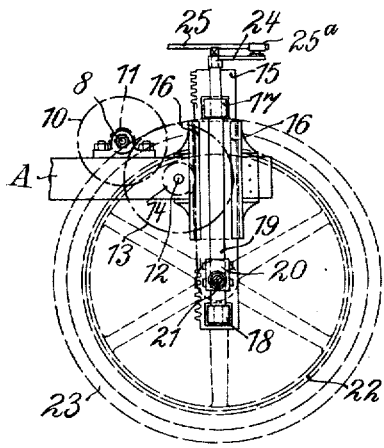
Figure 4:
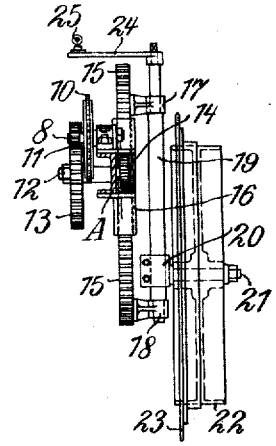
Figure 5:
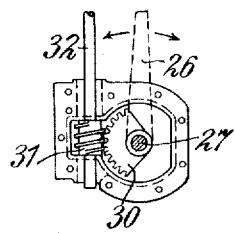
Figure 6:
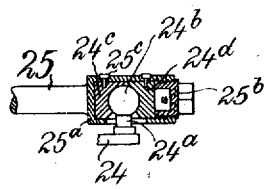

Figure 1 is a side elevation of a motor plow provided with my invention, Fig. 2 is a plan view thereof, with parts in section; Fig. 3 is a detail side elevation of the mechanism for raising and lowering the steering wheel; Fig. 4 is an edge view of the steering wheel and the mechanism attached thereto; Fig. 5 is a detail top view of the worm gearing for actuating said mechanism, and Fig. 6 is a vertical section of a universal joint.

The frame A carries the plow shares B and the internal combustion motor C which by means of a clutch D differential gearing E, pinions F and internal toothed gears G actuates the drive wheels H. These parts are shown only for the sake of completeness, and are described more fully in another application for Letters Patent filed by me concurrently herewith Serial No. 523,446.

Within convenient reach of the driver's seat 1 is located a hand crank 2 for turning the transverse horizontal shaft 5 journaled in bearings 3, 4 of the frame A. On this shaft is mounted rigidly a sprocket wheel 6, connected by a chain 7 with a sprocket wheel 10 on the shaft 8 journaled in the rear portion of the frame A. A vertically adjustable idler 9 (held in position by a set-screw or otherwise) bears against the chain 7 and keeps it taut. The shaft 8, which is disposed obliquely to the longitudinal axis of the vehicle, also carries a pinion 11 meshing with a gear wheel 13 rigidly secured to the shaft 12. This shaft carries another pinion 14 engaging a rack 15 movable vertically in guides 16 secured to the frame A and having their edges bent inward as shown in Fig. 2 to overlap the rack 15 on its front face. On this side the rack is provided with two bearings 17 and 18 for the reception of the vertical shaft 19 which cannot move vertically with reference to said bearings. By means of a clamp 20 or otherwise, the shaft 19 is connected rigidly with the horizontal axle 21 of the steering wheel 22. This wheel is provided with a sharp circumferential flange 23 which is adapted to cut into the soil and to offer the lateral resistance necessary for a proper steering of the machine.

The upper portion of the shaft 19 carries a crank arm 24 connected by a universal joint with the rear end of a connecting rod 25, the front end of which has a similar connection with a crank arm 26 on a horizontal shaft 27 journaled in a bearing 28. This bearing is formed in a bracket 29 carried by the frame A. A worm sector 30, carried by the shaft 27, is engaged by a worm 31 (Fig. 5) on a vertical shaft 32 which may be turned by means of a steering hand wheel 33, likewise within convenient reach of the driver.

The universal joints at the ends of the connecting rod 25 may be constructed as illustrated in Fig. 6. The crank arm 24 is provided with a pin 24ᵃ terminating in a ball 24ᵇ which is received in a socket formed by two sections 24ᶜ, 24ᵈ contained in a box 25ᵃ formed at the end of the rod 25. A screw plug 25ᵇ serves to hold the socket sections in place, and for additional safety, locking pins 25ᶜ may be employed. The frame A with the plow shares B is adjusted vertically in relation to the steering wheel 22, by turning the handle 2. The depth of the furrow is thus regulated. To hold the parts in the new position, I have shown a spring-pressed locking bar or pawl 34 rotatably secured to a carrier 35 and adapted to engage a ratchet wheel 36 rigid on the shaft 5.

The steering of the machine is effected by turning the handwheel 33, which swings the shaft 19 and the steering wheel 22 rotating on the axle 21. It will be observed that the steering of the vehicle may be accomplished even during the vertical adjustment of the steering wheel, the connections at the ends of the rod 25 being such as to preserve the operative relation of the sections of the steering mechanism even during such vertical adjustment. The rack 15 and bearings 17, 18 constitute a vertically adjustable carrier for the swinging wheel 22 (with its axle 21, clamp 20, and shaft 19). The mechanism for swinging the steering wheel comprises a section (the arm 24) mounted on the adjustable carrier, another section (terminating with the arm 26) mounted on the frame A, and a connection (rod 25) between said sections. Another means for regulating the depth of the furrow is shown in Figs. 1 and 2, the shares B being pivoted to the frame A about horizontal axes $B^1$ and provided with slots $B^2$ concentric with said axes. The frame A carries bolts $A^1$ projecting through said slots and receiving nuts $A^2$ for holding the shares after adjustment. This adjustment is employed especially to compensate for unequal wear of the plow shares.

Various modifications may be made without departing from the nature of my invention as set forth in the appended claims.

I claim as my invention:

1. A motor vehicle comprising a frame, a driver's seat, a steering wheel arranged to engage the ground in the rear of the driver's seat, a horizontal axle for said wheel, a vertical shaft to which said axle is secured, a rack mounted to slide up and down on said frame and carrying said vertical shaft, a crank at the upper portion of the shaft, an operating wheel in front of the driver's seat, a shaft journaled on the frame and connected with said wheel, a crank arm on said shaft, a connecting rod having universal joints connecting it with said crank and crank arm, each of said joints comprising a ball member, a socket member formed of two sections, a box containing said sections, and means for holding the socket members in said box, a pinion journaled in the frame and meshing with said rack, an operating member located in front of the driver's seat and adapted to be actuated by him, and an operative connection between said member and the pinion to turn the latter.

2. A motor vehicle comprising a frame, a vertically adjustable steering wheel arranged to engage the ground, a driver's seat, an upright steering shaft arranged in front of the said seat, an operative connection between said shaft and the steering wheel, a horizontal shaft, likewise arranged in front of the driver's seat, and mechanism, operated by the rotation of said horizontal shaft, for adjusting the steering wheel up and down relatively to the frame.

In testimony whereof, I have signed this specification in the presence of two subscribing witnesses.

ROBERT STOCK.

Witnesses:
 HENRY HASPER,
 WOLDEMAR HAUPT.